United States Patent
Kbayer et al.

(10) Patent No.: US 11,879,983 B2
(45) Date of Patent: Jan. 23, 2024

(54) LOCATION METHOD USING GNSS SIGNALS

(71) Applicant: Continental Automotive GmbH, Hannover (DE)

(72) Inventors: Nabil Kbayer, Toulouse (FR); Willy Vigneau, Muret (FR)

(73) Assignee: Continental Automotive GmbH, Hannover (DE)

( * ) Notice: Subject to any disclaimer, the term of this patent is extended or adjusted under 35 U.S.C. 154(b) by 80 days.

(21) Appl. No.: 17/426,716

(22) PCT Filed: Jan. 30, 2020

(86) PCT No.: PCT/EP2020/052218
§ 371 (c)(1),
(2) Date: Jul. 29, 2021

(87) PCT Pub. No.: WO2020/157161
PCT Pub. Date: Aug. 6, 2020

(65) Prior Publication Data
US 2022/0099843 A1 Mar. 31, 2022

(30) Foreign Application Priority Data
Jan. 30, 2019 (FR) ...................................... 1900850

(51) Int. Cl.
*G01S 19/42* (2010.01)
*G01S 19/24* (2010.01)
*G01S 19/00* (2010.01)

(52) U.S. Cl.
CPC ............ *G01S 19/42* (2013.01); *G01S 19/243* (2013.01); *G01S 19/00* (2013.01)

(58) Field of Classification Search
CPC ......... G01S 19/42; G01S 19/243; G01S 19/00
(Continued)

(56) References Cited

U.S. PATENT DOCUMENTS 9,420,412 B2 * 8/2016 Ho ........................ G01S 5/0072
10,466,366 B2 * 11/2019 Lee .......................... G01S 19/51
(Continued)

FOREIGN PATENT DOCUMENTS

| CN | 106292417 A | 1/2017 |
|---|---|---|
| CN | 107850671 A | 3/2018 |

OTHER PUBLICATIONS

Paul D. Groves, "Shadow Matching: A New GNSS Positioning Technique for Urban Canyons", Journal of Navigation 64(03): 417-430, 2011, The Royal Institute of Navigation, doi: 10.1017/S0373463311000087.
(Continued)

*Primary Examiner* — Chuong P Nguyen

(57) ABSTRACT

Locating a vehicle to be located ($V_P$), which has at least a GNSS receiver, via a location system including at least a computer by: receiving a message that includes at least a GNSS signal and that is transmitted by the vehicle to be located ($V_P$), receiving a message that is transmitted by at least one located vehicle ($V_L$), which has a GNSS receiver, the message including a location of the vehicle, the location being associated with a high confidence level, and a GNSS signal generated by the GNSS receiver of the vehicle, determining a location of the vehicle to be located, on the basis of the location of at least one located vehicle ($V_L$), the GNSS signal from the located vehicle, and the GNSS signal from the vehicle to be located, and transmitting the determined location to the vehicle to be located ($V_P$).

18 Claims, 2 Drawing Sheets

(58) Field of Classification Search
USPC .......................................... 342/357.25, 357.2
See application file for complete search history.

(56) References Cited

U.S. PATENT DOCUMENTS

| | | | |
|---|---|---|---|
| 11,670,169 B2 * | 6/2023 | Ashour | H04W 4/46 |
| | | | 701/422 |
| 2007/0299603 A1 * | 12/2007 | Kirby | G01C 21/28 |
| | | | 701/408 |
| 2015/0177003 A1 | 6/2015 | Ho | |
| 2016/0370805 A1 | 12/2016 | Mazur et al. | |
| 2017/0052260 A1 | 2/2017 | Ramamurthy | |
| 2017/0184726 A1 | 6/2017 | Lee et al. | |
| 2018/0113219 A1 | 4/2018 | Wuebbena | |
| 2018/0173229 A1 * | 6/2018 | Huang | G05D 1/0278 |
| 2019/0317225 A1 * | 10/2019 | Ewert | G01S 19/40 |

OTHER PUBLICATIONS

Search Report dated Nov. 28, 2019 from corresponding French Application No. FR 1900850.
International Search Report and Written Opinion dated Jun. 29, 2020 from corresponding International Patent Application No. PCT/EP2020/052218.
Office Action dated Sep. 27, 2023 from corresponding Chinese patent application No. 202080010228.2.
Yu Huabo et al. "Current status and prospects of high-precision vehicle dynamic navigation technology", Issue 11, 2003, 4 pages, Wanfang Data, China.

* cited by examiner

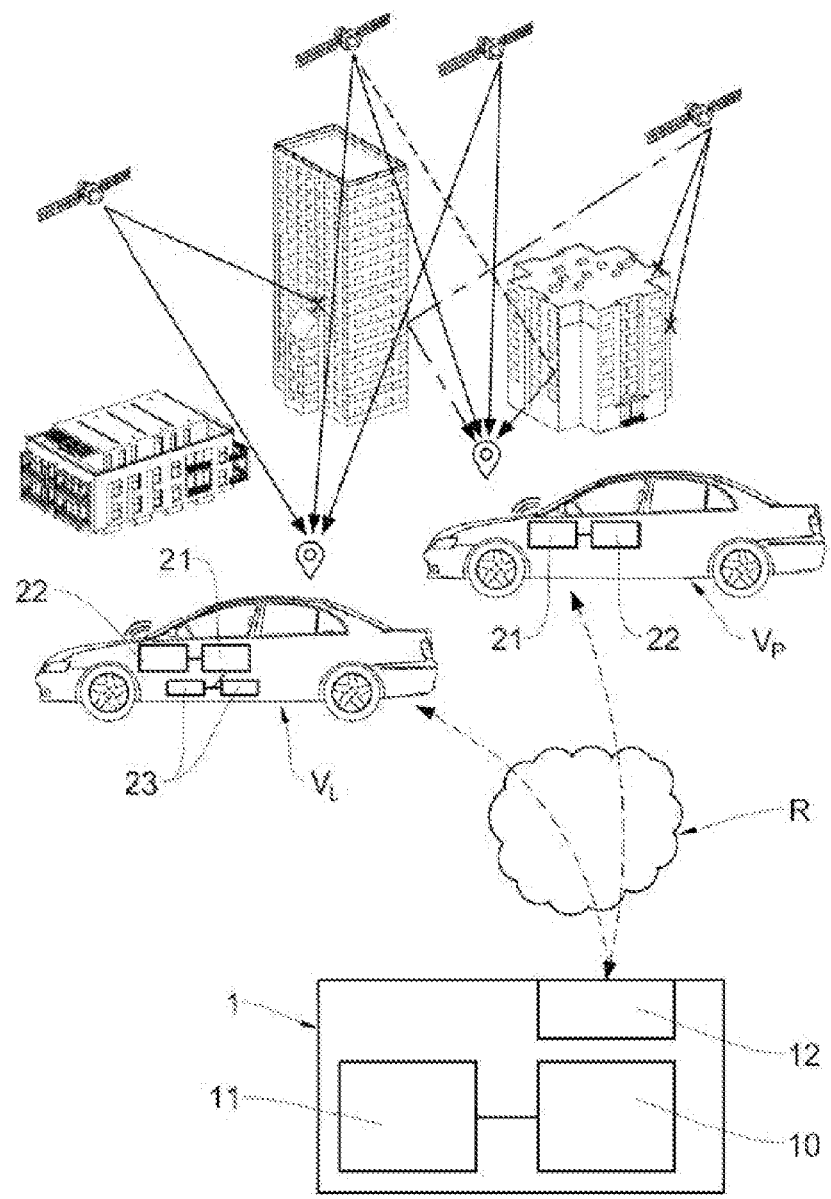
[Fig. 1]

[Fig. 2]
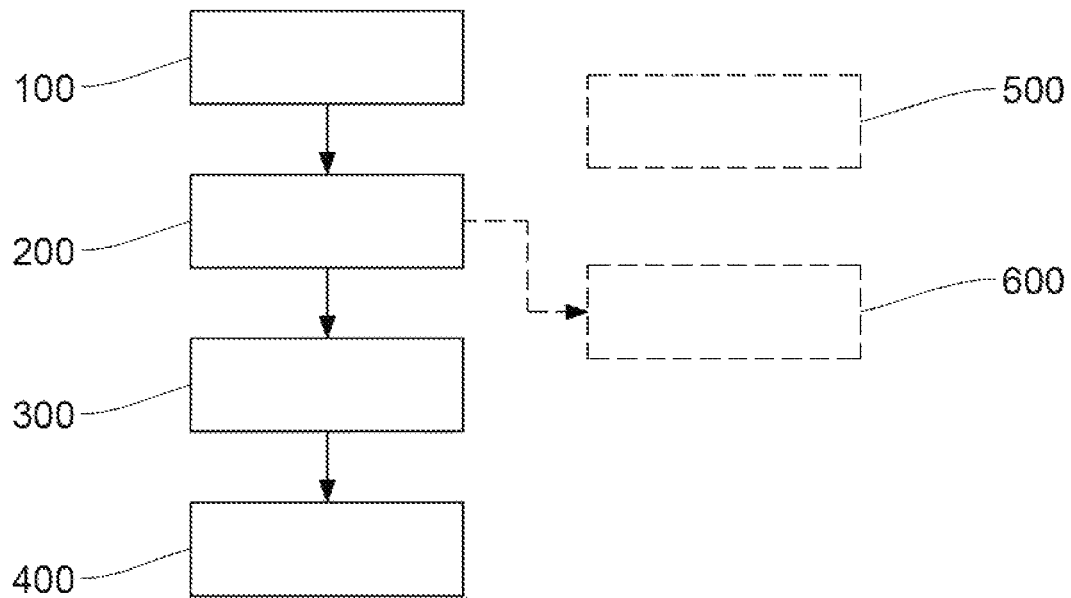
[Fig. 3]
| Az | Sat | Elev |
|---|---|---|
| 0° | Sat 24 | 30° |
| 1° | 0 | 0 |
| 2° | Sat 7 | 40° |
| 3° | 0 | 0 |
| . | . | . |
| . | . | . |
| . | . | . |
| 25° | 0 | 0 |
| 26° | Sat 12 | 72° |
| 27° | 0 | 0 |
| 28° | 0 | 0 |
| 29° | Sat 3 | 32° |
| 30° | 0 | 0 |
| . | . | . |
| . | . | . |
| . | . | . |
| 359° | 0 | 0 |

LOCATION METHOD USING GNSS SIGNALS

BACKGROUND

The invention relates to a method for locating a vehicle to be located comprising at least a GNSS receiver, and to a system for implementing said method.

Vehicles typically use satellite positioning signals, more commonly referred to as GNSS (Global Navigation Satellite System) signals, to locate themselves and provide audio and/or video guidance to the driver based on the location of the vehicle determined from the GNSS signals.

To this end, the vehicles are equipped with a GNSS receiver which constantly receives signals transmitted by satellites, which comprise data allowing the calculation of the geographical coordinates of the satellite, the speed of movement thereof and the date of transmission of the signal, and which make it possible, by processing in the GNSS receiver, to deduce the following therefrom, for each satellite from which a signal has been detected:
  an identification of the satellite from which the received signal originates,
  a reception strength, and
  the position of the satellite relative to the receiver, in azimuth and elevation.

The vehicle can be located by trilateration from the reception of signals from at least four satellites. In an urban environment, however, it is not possible to determine a location of the vehicle solely on the basis of the received GNSS signals since a number of obstacles—primarily buildings—may prevent or disrupt this reception by blocking or reflecting the signals.

To solve this problem, a number of solutions have already been proposed, using in particular 3D maps of the place being traveled by the vehicle in order to supplement the GNSS signals received by the vehicle and deduce a location therefrom. A 3D map is a digital representation of buildings or other obstacles that may be present in an urban environment, i.e. a conventional map of the environment augmented with the height of the buildings.

Among the approaches based on the use of 3D maps, there are known methods for simulating reception of GNSS signals that are based on 3D maps. These methods use an initial location projected in the 3D map and, by means of ray tracing algorithms, simulate the GNSS signals received upon a movement from the initial location and compare the signals actually received with the simulated signals.

Other methods extract geometric information from 3D maps to be able to predict GNSS reception signals at several candidate points on the map and to then assign a score to each candidate point and define the location of the vehicle as the point with the highest score. One example of such a method is "shadow matching", which is described in the publication by Paul D. Groves: "Shadow Matching: A New GNSS Positioning Technique for Urban Canyons", in The Journal of Navigation (2011), 64, 417-430

There are many problems associated with these techniques based on 3D maps.

Firstly, the fact that these algorithms depend on 3D maps means that these maps have to be constantly updated; otherwise, the location determined by the algorithm may be erroneous or imprecise. Moreover, 3D maps are often incomplete as they do not model all obstacles that may affect GNSS signal reception, such as trees or temporary obstacles (e.g. cranes, etc.).

Secondly, the use of 3D maps involves complicated calculations that affect both the accuracy of the algorithms and the ability to implement them in real time. For example, in the case of the "shadow matching" technique, a compromise has to be found on the number of selected candidate points; otherwise, the calculation is too large, but the reduction in the number of candidate points means a decrease in the location accuracy.

An alternative solution is therefore needed for locating vehicles in urban environments, where GNSS reception may be inferior.

BRIEF SUMMARY

In view of the above, the object of the invention is to overcome at least some of the drawbacks of the above-described prior art.

In particular, one purpose of the invention is to propose a GNSS-signal-based vehicle location method that is reliable, even in urban environments, and can be implemented in real time.

Another purpose of the invention is to propose a location method that does not rely on the use of 3D maps.

In this respect, the invention relates to a method for locating a vehicle to be located comprising at least a GNSS receiver, said method being implemented by a location system comprising at least a computer, a memory, and a remote communication interface, the method comprising the implementation of the steps of:
  receiving a message that is transmitted by a vehicle to be located and comprises at least a GNSS signal generated by the GNSS receiver of the vehicle,
  receiving a message transmitted by at least one located vehicle comprising a GNSS receiver, the message comprising a location of the vehicle, said location being associated with a high confidence level, and a GNSS signal generated by the GNSS receiver of the vehicle,
  determining a location of the vehicle to be located, on the basis of the location of at least one located vehicle, the GNSS signal from said located vehicle, and the GNSS signal from the vehicle to be located, and
  transmitting the determined location to the vehicle to be located.

In certain embodiments, the message transmitted by the vehicle to be located further comprises a location of the vehicle and a low confidence level of said location.

In certain embodiments, the method comprises receiving messages transmitted by a plurality of located vehicles, selecting at least one located vehicle for which the GNSS signal is close to the GNSS signal of the vehicle to be located, and determining the location of the vehicle to be located from the locations of the selected vehicles.

The location of the vehicle to be located can then be determined as the location of the selected located vehicle having the GNSS signal closest to the GNSS signal from the vehicle to be located, if the difference between the two GNSS signals is below a threshold.

The location of the vehicle to be located may also be determined as the most likely location of the vehicle to be located from among the locations of the selected located vehicles, or as a weighted average of the locations of the selected located vehicles, or by applying a Kalman filter to a location history of the vehicle to be located, constrained by the locations of the selected located vehicles.

In certain embodiments, the confidence level associated with a location of a vehicle is determined to be high if the located vehicle comprises at least one sensor in addition to the GNSS receiver, an overall high confidence level is associated with the vehicle, or a high confidence level is associated with the GNSS reception conditions.

A GNSS signal typically comprises, for each satellite from which a signal is received, the identification of the satellite, a strength level of the received signal, and the position of the satellite relative to the GNSS receiver.

The method may further comprise receiving a message that is transmitted by at least one located vehicle and indicates an area of low GNSS reception quality, and transmitting, once the location of the vehicle to be located has been determined, to said vehicle, a message indicating the area of low GNSS reception quality, if said area is located at a distance from the determined location that is less than a predetermined threshold.

The invention also relates to a computer program product, comprising code instructions for implementing the method according to the above description, when said method is implemented by a computer.

The invention also relates to a location system comprising at least a computer, a memory and a remote communication interface suitable for communicating with a plurality of vehicles equipped with GNSS receivers via a telecommunications network, characterized in that the location system is configured to implement the method according to the above description.

The method according to the invention makes it possible to provide a vehicle with a location on the basis of the similarity between the GNSS signal reception conditions thereof and the GNSS signal reception conditions of other vehicles, the location of which is determined in a way that is robust (i.e. accurate, continuous and reliable), because, for example, said vehicles use sensors in addition to the GNSS receivers.

This process makes it possible to avoid using 3D maps and requires far fewer computations than methods that use these maps. Moreover, the location obtained is reliable because it takes into account the GNSS signals received simultaneously by vehicles close to the vehicle to be located, and therefore takes into account all the obstacles present in the environment, including temporary obstacles or those that would not be shown in a 3D map.

BRIEF DESCRIPTION OF THE DRAWINGS

Further features, details and advantages of the invention will become apparent upon reading the following detailed description and analyzing the accompanying drawings, in which:

FIG. 1 is a schematic depiction of a location system for implementing the location method according to one embodiment of the invention.

FIG. 2 shows the main steps of the location method according to one embodiment of the invention.

FIG. 3 shows an example of a portion of a GNSS signal.

DETAILED DESCRIPTION

With reference to FIG. 1, a method for locating a vehicle comprising at least a GNSS receiver is implemented by a location system 1, which comprises at least a computer 10, e.g. a processor, a microprocessor, a microcontroller, etc., and a memory 11, which stores code instructions that can be executed by the computer to implement the location method. The location system 1 further comprises a remote communication interface 12, which allows a connection to be established with a telecommunications network R, for example a network using one of the protocols GPRS, EDGE, UMTS, 3G, 4G, Wi-Fi, WiMAX, Internet, etc., and allows messages to be transmitted and received via said network. Said interface allows the computer 10 to communicate with vehicles V, as will be discussed in more detail below. Thus, the location system 1 is advantageously a remote server that carries out the method of remotely locating vehicles—and is thus able to concentrate data from a large number of vehicles—on the model of cloud computing.

The location system 1 is in communication with a plurality of vehicles, each vehicle being equipped, for this purpose, with an interface 22 for communicating with the telecommunications network R, and a GNSS receiver 21 suitable for receiving signals from one or more satellites and processing said signals to obtain a GNSS signal, which comprises:

an identification of each satellite from which a signal is received, typically PRN (pseudo-random noise) or an SVN (space vehicle number),
a strength level of the received signal, and
the position of the satellite relative to the GNSS receiver, said relative position being expressed in azimuth and elevation.

In order to deduce the GNSS signal from the signals received by the satellites, each GNSS receiver 21 typically comprises a regularly updated satellite ephemeris in a memory.

Advantageously, but optionally, the relative positions of the satellites from which signals are received by a GNSS receiver may be expressed as a vector comprising 360 lines, each line corresponding to one degree of azimuth, and for each azimuth angle, the elevation angle value at which a satellite from which a signal has been received is located. Typically, elevation angle values are assigned to only a few azimuth angle values, each elevation angle value corresponding to one satellite. An example of a portion of a GNSS signal is shown in FIG. 3, said signal comprising the identification of each satellite from which a signal is received and the position of the satellite relative to the GNSS receiver, expressed in azimuth and elevation.

Each GNSS receiver 21 of a vehicle is further suitable for deducing, from the obtained GNSS signal, in a case where signals are received from at least four satellites, a location of the GNSS receiver 21 and thus of the vehicle, by trilateration.

In FIG. 1, the signals transmitted by satellites and received by a GNSS receiver are represented by an arrow, the signals reflected by obstacles are represented by a dashed arrow, and the signals blocked by obstacles and thus not reaching a vehicle GNSS receiver are represented by a line ending in a cross.

In addition, some vehicles may further comprise at least one additional sensor 23, which allows the location determined by the GNSS receiver 21 to be supplemented or confirmed. The additional sensor may be a camera, accelerometer, odometer, etc. The connection interface with the network R may comprise a Wi-Fi antenna, in which case the number of Wi-Fi networks and the reception quality of each network may constitute data complementary to the location data determined from the GNSS signals, as will be discussed in more detail below.

With reference to FIG. 2, a method for locating a vehicle to be located, implemented by the above-described system, will now be described.

In a step 100, the computer 10 receives a message transmitted by a vehicle to be located $V_P$, the message comprising at least a GNSS signal generated by the GNSS receiver of the vehicle on the basis of signals received from one or more satellites by said GNSS receiver.

In the following, "vehicle to be located" $V_P$ is to be understood to mean a vehicle for which the GNSS receiver has not been able to determine a location, e.g. because said GNSS receiver has received signals from fewer than four satellites, or a vehicle for which the GNSS receiver has been able to determine a location, but with a low confidence level.

For example, a low confidence level may be attributed by default to a vehicle, depending on the model of the vehicle, the type of sensors integrated therein, etc. According to another example, a low confidence level may be attributed to a location if said location is obtained only from GNSS signals, without being supplemented or confirmed by additional data, or if the low confidence level can be attributed to poor GNSS reception quality, i.e. to poor reception quality of the signals from the satellites from which the GNSS signals are generated. Poor GNSS reception quality occurs, for example, if the GNSS signal strength is low and/or the satellites from which signals have been received are poorly distributed in the sky. Alternatively, a low confidence level may be attributed to a vehicle on the basis of a history of vehicle locations that have proven to be inaccurate, imprecise or unreliable. Therefore, the message transmitted by the vehicle to be located $V_P$ and received by the computer 10 may comprise only the GNSS signal from the vehicle, or also a location of the vehicle, said location being associated with a low confidence level.

In a step 200, the computer 10 receives a message transmitted by at least one located vehicle $V_L$, the message comprising at least a GNSS signal generated by the GNSS receiver of said vehicle, and a location of the vehicle, said location being associated with a high confidence level.

In the following, a "located vehicle" $V_L$ is to be understood to mean a vehicle for which the GNSS receiver has been able to determine a location, and for which the associated confidence level is high. A high confidence level may be attributed by default to a vehicle, depending on the model of the vehicle, the type of sensors integrated therein, etc. A confidence level may advantageously be attributed to a vehicle if said vehicle comprises additional sensors 23 suitable for providing data that supplement the GNSS signals and thus confirm the obtained location data. For example, an image acquired by a camera that provides information on the environment of the vehicle, or odometric or accelerometric data may be used to confirm the location data obtained by the GNSS signals. Finally, a high confidence level may also be attributed to a vehicle on the basis of the location history thereof, if said history has proven to be reliable and accurate.

Alternatively, a high confidence level may be attributed to the location if the high confidence level can be attributed to the GNSS reception quality, i.e. to the reception quality of the signals that originate from the satellites and allow the GNSS signals to be generated. High GNSS reception quality occurs, for example, if the strength of the received signals is high and signals have been received from a large number of satellites, thus increasing the location accuracy.

If the computer 10 does not receive a message from a located vehicle $V_L$, i.e. a GNSS signal associated with a vehicle location and a high confidence level, said computer is not able to implement the rest of the method and to locate the vehicle to be located $V_P$.

Preferably, each message received from a vehicle or each GNSS signal included in a message is time-stamped so as to provide an indication of when the GNSS signal was generated by the GNSS receiver of the vehicle. Advantageously, but optionally, the computer 10 may compare the time stamps from the vehicle to be located $V_P$ and each located vehicle $V_L$ and only continue the location method if the time stamps are consistent, with a predetermined latency time, for example 1 second, preferably between 1 and 10 seconds. This ensures that the GNSS signals generated by the various vehicles were generated at the same time, and thus that the GNSS signals and the locations of the vehicles are comparable.

In a step 300, the computer 10 determines a location of the vehicle to be located $V_P$ from the location of and the GNSS signal from at least one located vehicle for which a message was received in step 200.

For this, the computer 10 looks in the messages received in step 200 for messages 200 comprising a GNSS signal similar to the GNSS signal received from the vehicle to be located $V_P$. This is because close or identical GNSS signals indicate similar relative positions between the vehicles and the satellites from which signals were received, and thus similar absolute positions between the vehicles. The similarity of the GNSS reception conditions is therefore used to make a correction to the location for vehicles with a lower confidence or to provide a location for vehicles for which said location is not available.

In one embodiment, the computer 10 selects, from among the GNSS signals received from located vehicles, those for which a degree of similarity with the GNSS signal from the vehicle to be located exceeds a predetermined threshold.

The similarity between two GNSS signals may be calculated from the number of common satellites "visible" to the GNSS receivers, which is correlated with the positions of the satellites in azimuth and elevation. Preferably, the similarity calculation does not take into account the level of reception strength of the signals received from the satellites since this characteristic is specific to a GNSS receiver. Thus, two different GNSS receivers located at the same place may have different GNSS signal strengths.

Then, in a step 400, the computer 10 determines a location of the vehicle to be located $V_P$ from the locations of the vehicles for which the GNSS signals were selected. For example, the location of the vehicle to be located may be determined as the location of the located vehicle $V_L$ for which the GNSS signal is closest to that of the vehicle to be located $V_P$. In this case, the requirement for the similarity between the GNSS signal from the closest located vehicle and that of the vehicle to be located can be made stricter. This determination of the location of the vehicle to be located can therefore be made conditional on the degree of similarity between the GNSS signal therefrom and the closest GNSS signal from among the selected located vehicles being greater than a second threshold that is higher than the first.

According to another example, the locations of all selected vehicles may be taken into account in order to deduce the location of the vehicle to be located. For example, the location of the vehicle $V_P$ may be chosen as the most likely location from among the locations of the located vehicles $V_L$, or a location obtained from a weighted average of the various locations of the located vehicles $V_L$.

Alternatively, the location may be determined by adding, to the various available locations of the selected vehicles, additional information on the location history of the vehicle to be located $V_P$. This is because, although the vehicle to be located does not have a location or has a location with a low confidence level when the method is implemented, said vehicle may have been located in previous iterations, and the loss of location may be the result of a change in the reception conditions of the satellite signals (for example, passing through a tunnel, a dense urban area with many reception obstacles, etc.). In this case, the computer 10 implements a Kalman filter to propagate the location history of the vehicle, while taking into account the constraints stemming from the locations of the selected vehicles. Once the location of the vehicle to be located $V_P$ has been determined, the computer 10 returns said location to the vehicle to be located $V_P$. Said computer may also store said location associated with the vehicle in the memory in order to supplement a history associated with said vehicle.

In one embodiment, the computer 10 may also receive, in a step 500, from a vehicle with which a high confidence level is associated, a message indicating an area of poor GNSS signal reception quality, i.e., for which it is not possible to determine a location solely on the basis of the satellite signals. The placement of this area may be determined from a last available location of the vehicle and additional data such as odometry data providing movement of the vehicle since said last location. In this case, the computer 10 may return said information to the vehicle to be located if said vehicle is approaching the area. For example, the message sent in step 400 may be supplemented with an alert signal, if the location determined for the vehicle to be located is close to the area of poor GNSS signal reception quality. Alternatively, the computer 10 may transmit said information in a message separate from the message transmitted in step 400. The computer 10 may also transmit said information to a located vehicle, for example in response 600 to a message that is received in step 200 and provides the location of the vehicle, if said location is close to the area of poor reception quality.

Thus, it is possible to correct or supplement the location of vehicles for which a location based on GNSS signals alone is not available without complex and costly processing, and without the need to store and maintain an updated 3D map of the areas traveled by the vehicles.

The invention claimed is:

1. A method for locating a vehicle to be located ($V_P$) comprising at least a GNSS receiver, said method being implemented by a location system comprising at least a computer, a memory and a remote communication interface, the method comprising:
   receiving a message that is transmitted by a vehicle to be located ($V_P$) and comprises at least a GNSS signal generated by the GNSS receiver of the vehicle,
   receiving messages transmitted by a plurality of located vehicles ($V_L$) comprising a GNSS receiver, the message comprising a location of the vehicle, said location being associated with a high confidence level, and a GNSS signal generated by the GNSS receiver of the vehicle, wherein the high confidence level is based on at least one of: a model of the vehicle, a type of sensor integrated within the vehicle, sensors, which are capable of supplementing the GNSS signals, integrated within the vehicle, an image, which provides information about an environment of the vehicle and which has been acquired by a camera integrated within the vehicle, odometric data of the vehicle, accelerometric data of the vehicle, a location history of the vehicle, a strength of the signals received from GNSS satellites, and a number of GNSS satellites from which signals have been received,
   selecting, from the GNSS signals received from located vehicles, the GNSS signals of which a degree of similarity with the GNSS signal received from the vehicle to be located exceeds a particular threshold, wherein the degree of similarity is based on a number of satellites visible to both the GNSS receiver of the vehicle to be located ($Y_P$) and the GNSS receivers of the located vehicles ($V_L$) as indicated by azimuth and elevation positions of the satellites,
   determining a location of the vehicle to be located, on the basis of the location of at least one located vehicle ($V_L$) for which the GNSS signal is selected, the GNSS signal from said located vehicle, and the GNSS signal from the vehicle to be located, and
   transmitting the determined location to the vehicle to be located ($V_P$).

2. The location method according to claim 1, wherein the message transmitted by the vehicle to be located ($V_P$) further comprises a location of the vehicle and a low confidence level of said location, wherein the low confidence level is based on at least one of: a model of the vehicle, a type of sensor integrated within the vehicle, a location, obtained only from GNSS signals, of the vehicle, poor reception quality of signals from GNSS satellites due to at least one of low signal strength and poor distribution of GNSS satellites in the sky, and a history of vehicle locations that are at least one of inaccurate, imprecise, and unreliable.

3. The location method according to claim 2, wherein the location of the vehicle to be located ($V_P$) is determined as the location of the selected located vehicle ($V_L$) having the GNSS signal closest to the GNSS signal of the vehicle to be located, if the difference between the two GNSS signals is below a threshold.

4. The location method according to claim 2, wherein the location of the vehicle to be located ($V_P$) is determined as the most likely location of the vehicle to be located from among the locations of the selected located vehicles ($V_L$), or as a weighted average of the locations of the selected located vehicles ($V_L$), or by applying a Kalman filter to a location history of the vehicle to be located, constrained by the locations of the selected located vehicles ($V_L$).

5. The location method according to claim 1, wherein a GNSS signal comprises, for each satellite from which a signal is received, the identification of the satellite, a strength level of the received signal, and the position of the satellite relative to the GNSS receiver.

6. The location method according to claim 5, further comprising receiving a message that is transmitted by at least one located vehicle and indicates an area of low GNSS reception quality, and transmitting, once the location of the vehicle to be located has been determined, to said vehicle, a message indicating the area of low GNSS reception quality, if said area is located at a distance from the determined location that is less than a predetermined threshold.

7. A computer program product, comprising code instructions for implementing a method for locating a vehicle to be located (VP) comprising at least a GNSS receiver, said method being implemented by a location system comprising at least a computer, a memory and a remote communication interface, the method comprising:
   receiving a message that is transmitted by a vehicle to be located ($V_P$) and comprises at least a GNSS signal generated by the GNSS receiver of the vehicle,
   receiving messages transmitted by a plurality of located vehicles ($V_L$) comprising a GNSS receiver, the message comprising a location of the vehicle, said location being associated with a high confidence level, and a GNSS signal generated by the GNSS receiver of the vehicle, wherein the high confidence level is based on at least one of: a model of the vehicle, a type of sensor integrated within the vehicle, sensors, which are capable of supplementing the GNSS signals, integrated within the vehicle, an image, which provides information about an environment of the vehicle and which has been acquired by a camera integrated within the vehicle, odometric data of the vehicle, accelerometric data of the vehicle, a location history of the vehicle, a strength of the signals received from GNSS satellites, and a number of GNSS satellites from which signals have been received, selecting, from the GNSS signals received from located vehicles, the GNSS signals of which a degree of similarity with the GNSS signal received from the vehicle to be located exceeds a particular threshold, wherein the degree of similarity is based on a number of satellites visible to both the GNSS receiver of the vehicle to be located ($V_P$) and the GNSS receivers of the located vehicles ($V_L$) as indicated by azimuth and elevation positions of the satellites, determining a location of the vehicle to be located, on the basis of the location of at least one located vehicle ($V_L$) for which the GNSS signal is selected, the GNSS signal from said located vehicle, and the GNSS signal from the vehicle to be located, and transmitting the determined location to the vehicle to be located ($V_P$).

8. The computer program product of claim 7, wherein the message transmitted by the vehicle to be located ($V_P$) further comprises a location of the vehicle and a low confidence level of said location, wherein the low confidence level is based on at least one of: a model of the vehicle, a type of sensor integrated within the vehicle, a location, obtained only from GNSS signals, of the vehicle, poor reception quality of signals from GNSS satellites due to at least one of low signal strength and poor distribution of GNSS satellites in the sky, and a history of vehicle locations that are at least one of inaccurate, imprecise, and unreliable.

9. The computer program product of claim 8, wherein the location of the vehicle to be located ($V_P$) is determined as the location of the selected located vehicle ($V_L$) having the GNSS signal closest to the GNSS signal of the vehicle to be located, if the difference between the two GNSS signals is below a threshold.

10. The computer program product of claim 8, wherein the location of the vehicle to be located ($V_P$) is determined as the most likely location of the vehicle to be located from among the locations of the selected located vehicles ($V_L$), or as a weighted average of the locations of the selected located vehicles ($V_L$), or by applying a Kalman filter to a location history of the vehicle to be located, constrained by the locations of the selected located vehicles ($V_L$).

11. The computer program product of claim 7, wherein a GNSS signal comprises, for each satellite from which a signal is received, the identification of the satellite, a strength level of the received signal, and the position of the satellite relative to the GNSS receiver.

12. The computer program product of claim 11, further comprising receiving a message that is transmitted by at least one located vehicle and indicates an area of low GNSS reception quality, and transmitting, once the location of the vehicle to be located has been determined, to said vehicle, a message indicating the area of low GNSS reception quality, if said area is located at a distance from the determined location that is less than a predetermined threshold.

13. A location system comprising at least a computer, a memory and a remote communication interface suitable for communicating with a plurality of vehicles equipped with GNSS receivers via a telecommunications network, characterized in that the location system is configured to implement a method for locating a vehicle to be located (VP) comprising at least a GNSS receiver, said method comprising:

receiving a message that is transmitted by a vehicle to be located ($V_P$) and comprises at least a GNSS signal generated by the GNSS receiver of the vehicle, receiving messages transmitted by a plurality of located vehicles ($V_L$) comprising a GNSS receiver, the message comprising a location of the vehicle, said location being associated with a high confidence level, and a GNSS signal generated by the GNSS receiver of the vehicle, wherein the high confidence level is based on at least one of: a model of the vehicle, a type of sensor integrated within the vehicle, sensors, which are capable of supplementing the GNSS signals, integrated within the vehicle, an image, which provides information about an environment of the vehicle and which has been acquired by a camera integrated within the vehicle, odometric data of the vehicle, accelerometric data of the vehicle, a location history of the vehicle, a strength of the signals received from GNSS satellites, and a number of GNSS satellites from which signals have been received, selecting, from the GNSS signals received from located vehicles, the GNSS signals of which a degree of similarity with the GNSS signal received from the vehicle to be located exceeds a particular threshold, wherein the degree of similarity is based on a number of satellites visible to both the GNSS receiver of the vehicle to be located ($V_P$) and the GNSS receivers of the located vehicles ($V_L$) as indicated by azimuth and elevation positions of the satellites, determining a location of the vehicle to be located, on the basis of the location of at least one located vehicle ($V_L$) for which the GNSS signal is selected, the GNSS signal from said located vehicle, and the GNSS signal from the vehicle to be located, and transmitting the determined location to the vehicle to be located ($V_P$).

14. The location system according to claim 13, wherein the message transmitted by the vehicle to be located ($V_P$) further comprises a location of the vehicle and a low confidence level of said location, wherein the low confidence level is based on at least one of: a model of the vehicle, a type of sensor integrated within the vehicle, a location, obtained only from GNSS signals, of the vehicle, poor reception quality of signals from GNSS satellites due to at least one of low signal strength and poor distribution of GNSS satellites in the sky, and a history of vehicle locations that are at least one of inaccurate, imprecise, and unreliable.

15. The location system according to claim 14, wherein the location of the vehicle to be located ($V_P$) is determined as the location of the selected located vehicle ($V_L$) having the GNSS signal closest to the GNSS signal of the vehicle to be located, if the difference between the two GNSS signals is below a threshold.

16. The location system according to claim 13, wherein the location of the vehicle to be located ($V_P$) is determined as the most likely location of the vehicle to be located from among the locations of the selected located vehicles ($V_L$), or as a weighted average of the locations of the selected located vehicles ($V_L$), or by applying a Kalman filter to a location history of the vehicle to be located, constrained by the locations of the selected located vehicles ($V_L$).

17. The location system according to claim 15, wherein a GNSS signal comprises, for each satellite from which a signal is received, the identification of the satellite, a strength level of the received signal, and the position of the satellite relative to the GNSS receiver.

18. The location system according to claim 17, further comprising receiving a message that is transmitted by at least one located vehicle and indicates an area of low GNSS reception quality, and transmitting, once the location of the vehicle to be located has been determined, to said vehicle, a message indicating the area of low GNSS reception quality, if said area is located at a distance from the determined location that is less than a predetermined threshold.

\* \* \* \* \*